Aug. 2, 1960　　　　　　H. R. WHITFIELD　　　　　　2,947,983
MEASUREMENT OF THE SPEED OF VEHICLES

Filed Aug. 9, 1954　　　　　　　　　　　　　　2 Sheets-Sheet 1

INVENTOR
H. R. WHITFIELD
BY
Morse & Hall
ATTORNEYS

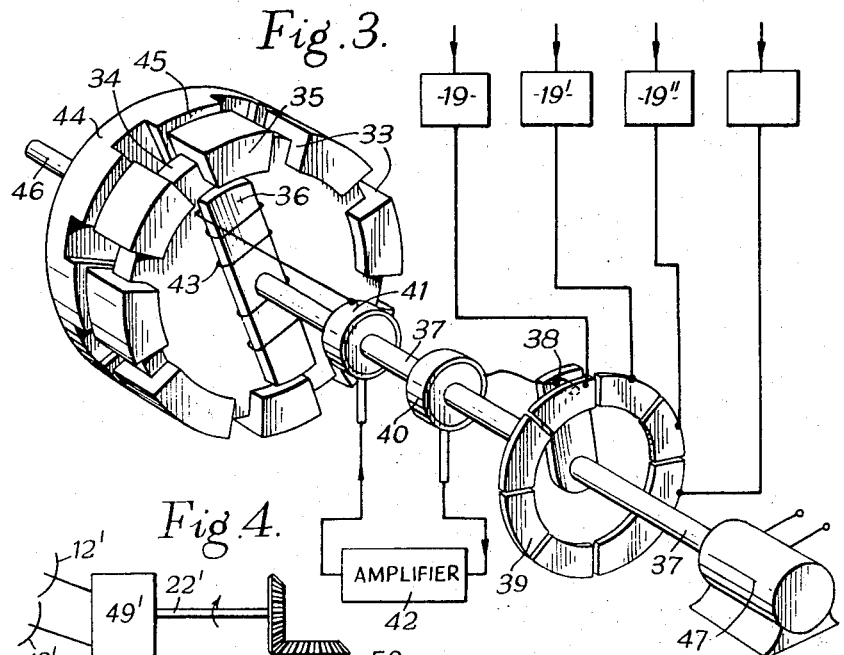
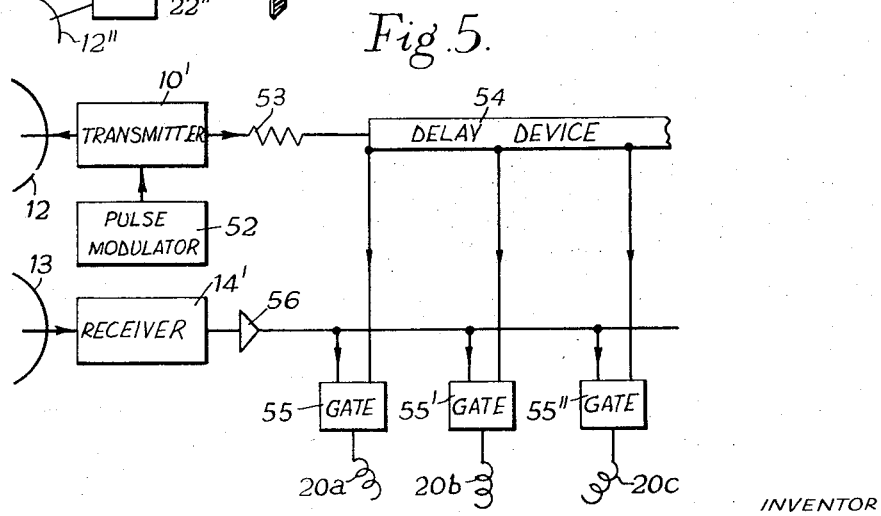

2,947,983
MEASUREMENT OF THE SPEED OF VEHICLES

Harold R. Whitfield, Barkingside, England, assignor to Kelvin & Hughes Limited, Glasgow, Scotland Filed Aug. 9, 1954, Ser. No. 448,644

Claims priority, application Great Britain Aug. 13, 1953

10 Claims. (Cl. 343—8)

The present invention relates to the measurement of the speed of vehicles using radar apparatus of the kind in which radiation from a transmitting station on the vehicle is reflected by objects and the echoes are received by a receiver at the station, either the transmitter or the receiver, or both the transmitter and receiver, being directional.

The invention also makes use of what will be termed a range responsive device, which is a device having a number of output terminals and so constituted and associated with a radar receiver that echoes from objects at different ranges generate voltages at different ones of the terminals. Various forms of this device are known and certain of these will be referred to in more detail later.

When the vehicle is moving, echoes from fixed objects ahead of the vehicle will produce voltages at the aforesaid terminals in succession, and if the terminals are arranged along a line in an order corresponding to increasing or decreasing range these voltages may be regarded as moving along the line of the terminals. The speed of "movement" of the voltages along the line of the terminals will be dependent upon the speed of the vehicle irrespective of the absolute ranges of the objects producing the echoes, and in the present invention this speed of "movement" is made use of in order to measure the speed of the vehicle. If, as is usually convenient, successive terminals along the line correspond to equally-spaced ranges, and if the echoes are received from objects directly in the line of movement of the vehicle, or at a fixed angle to the line of movement, the speed of the "movement" of the voltages will be directly proportional to the speed of movement of the vehicle.

According to the present invention, therefore, a speed or distance measuring device for a vehicle comprises radar apparatus of the kind specified, a range responsive device as hereinbefore defined associated with the radar apparatus, means for applying voltages generated at the said terminals of the range responsive device to generate a moving magnetic field whose speed of movement is dependent on the rate at which voltages representative of echoes from fixed objects pass from one of the terminals to the next, and means for indicating the speed or for counting the number of revolutions of the magnetic field.

Figure 1:
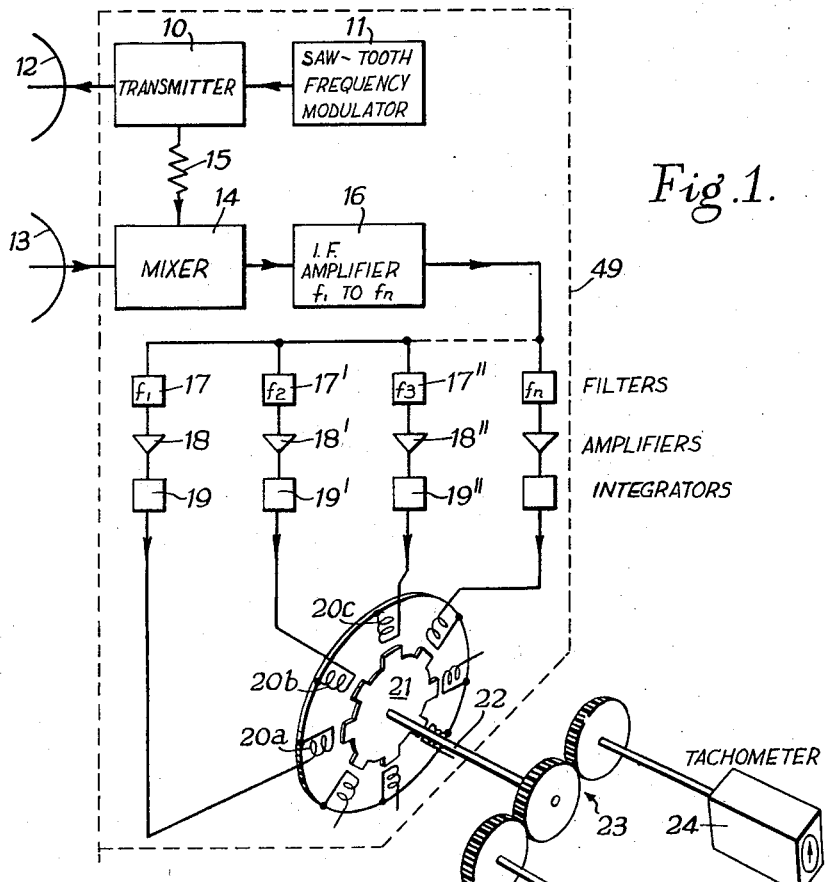
Figure 2:
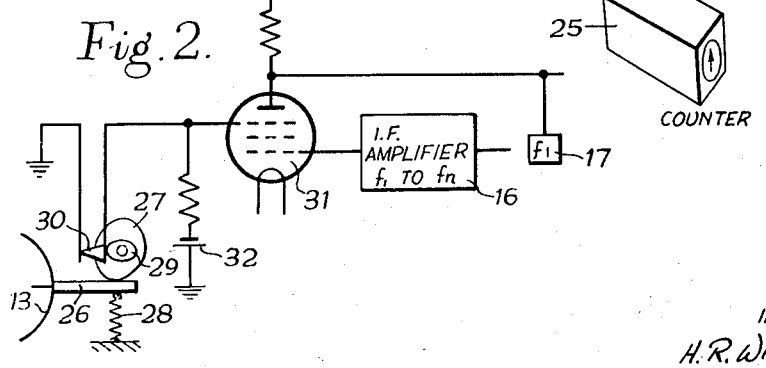

The invention will be described by way of example with reference to the accompanying drawings in which:

Fig. 1 is a diagram of one embodiment of the invention employing frequency modulation, Fig. 2 illustrates a modification of Fig. 1 for use when the radar equipment used for speed measurement is also used for some other purpose, Fig. 3 shows diagrammatically a simplified form of a part of Fig. 1, Fig. 4 shows how two arrangements according to Fig. 1 can be used to measure drift, Fig. 5 is a diagram showing a modification of a part of Fig. 1 to adapt the apparatus for operation with pulses.

Referring to Fig. 1, the form of radar apparatus and range responsive device used is one in which the radiation emitted is arranged to be of substantially constant amplitude and to have a sawtooth modulation of frequency. The frequency of the radiation thus increases linearly from one datum value to a second datum value and then returns nearly instantaneously to the first datum value. In Fig. 1 a transmitter 10 has its frequency modulated in accordance with a saw-tooth oscillation from a modulator 11 and the oscillations are radiated from an aerial 12. The radiation reflected from surrounding objects is picked up by an aerial 13 and applied to a mixer 14 together with a small fraction of the output from the transmitter 10 which is taken through an attenuator 15. The output of the mixer will thus contain a number of components of different frequencies $f_1, f_2, f_3 \ldots f_n$, each component corresponding to a different range. These components are amplified in an I.F. amplifier 16.

In this case the range responsive device itself comprises a number of frequency selective networks represented by filters 17, 17', 17" etc. the frequencies of which differ by equal increments of frequency corresponding to equal increments of range. The output terminals of the respective frequency selective networks constitute the aforesaid terminals of the range responsive device.

In Fig. 1 the said terminals are connected through amplifiers 18, 18' etc. and integrating or smoothing devices 19, 19' etc. to different windings $20a$, $20b$, $20c$ etc. of a stator cooperating with a phonic wheel 21, the connections being so made that proceeding around the stator the windings are energized from terminals corresponding to progressively increasing range. It will be evident that, when a vehicle is moving, a given stationary object directly ahead of the vehicle will produce echoes whose range is progressively decreasing at a speed equal to the speed of the vehicle, and the rotating magnetic field produced by the stator windings will move around the stator at a speed proportional to the speed of the vehicle. The phonic wheel 21 will thus rotate at a speed proportional to the speed of the vehicle on which the apparatus is mounted. The shaft 22 of the phonic wheel may be coupled by suitable gearing 23 to a tachometer 24, indicating the speed of the vehicle and to a counter 25 indicating the distance moved by the vehicle relative to the reflecting objects.

It has so far been assumed that the echoes are received from objects directly in the line of movement of the vehicle. This will not always be convenient, and where the echoes are received in a direction inclined at some acute angle to the direction of movement of the vehicle the calibration of the speed indicating means and counter may be made to take into account the obliquity of the direction from which the echoes are received.

It will sometimes be required to use for the purposes of speed measurement in accordance with the present invention a radar apparatus which is used also for other purposes and in which the aerial employed scans an area ahead of the vehicle. In this case, in order to derive the signals needed for the speed measurement, the output from the receiver may be strobed at suitable instants of time when the echoes received are from a direction directly ahead of the vehicle or from some other predetermined suitable direction, and the strobed output may then be applied to the stator windings through the range responsive device as already described. Thus as shown diagrammatically in Fig. 2, the receiving aerial 13 is oscillated about an axis 26 by means of a cam 27 opposed by a spring 28. A further cam 29 rotating with the cam 27 closes contacts 30 when the aerial 13 is facing directly ahead. The contacts 30 serve, when closed, to earth the suppressor grid of a pentode 31, which is otherwise held negative by a battery 32, and thus render the pentode operative. The signals from the I.F. amplifier 16 of Fig. 1 are applied to the control grid of the pentode and the anode of the pentode is connected to the filters 17 etc. in Fig. 1. In this way the arrangement of Fig. 1 is rendered operative only at times when the aerial 13 is facing directly ahead. When the transmitting aerial is directive it is oscillated with the receiving aerial, or, of course, if desired, a single aerial may be used for transmitting and receiving in a manner well known in the art. The apparatus for accomplishing the other purposes by means of the radar apparatus, as referred to, is not shown.

When the apparatus is used in an aircraft, for example, the scanning may be in the form of a spiral and it may be convenient in this case to arrange that the strobing takes place only once in each complete spiral scan in order that the direction from which the strobed echoes are obtained is always the same. If strobing takes place in more than one direction suitable switching circuits must be provided in order to introduce compensation for the different directions from which the echoes are received when strobing takes place.

The arrangement described with reference to Fig. 1 requires a considerable number of stator windings and also an equal number of amplifiers between the aforesaid terminals of the range responsive device and the individual stator windings. A modified arrangement which is somewhat simpler is illustrated in Fig. 3. In this example the stator comprises a number of unwound segments 33 of magnetic material each of L-shape. One limb of the L may be mounted upon the periphery of a drum 34 and the other limb 35 may rest upon the one flat face of the drum thus projecting radially inwards. As electromagnet 36 is mounted for rotation upon a shaft 37 in such a manner that its poles sweep over the last-mentioned limbs of the segments in close proximity thereto. A brush 38 is mounted upon the shaft 37 and a fixed commutator is arranged to co-operate with the brush. Each segment of the commutator is connected to a different one of the said output terminals of the range responsive device, that is one of the integrators 19, 19' etc. in Fig. 1. The commutator brush 38 is connected through slip rings 40, 41 and an amplifier 42 to the winding 43 of the electromagnet. The number of commutator segments and the position of these segments in relation to the segments of the stator are such that as the electromagnet is rotated it is energised in turn from the terminals of the range responsive device as it comes opposite to the consecutive segments 33 of the stator. In this way a rotating magnetic field is generated by the stator as previously described and a phonic wheel 44, which may as shown have segments 45 of magnetic material moving over end faces of the stator segments 33, will rotate at a speed dependent on the speed of movement of the vehicle. The phonic wheel 44 is mounted on a shaft 46 independent of the shaft 37 and may be coupled to indicating means in the same way as the shaft 22 in Fig. 1.

A further electromagnet (not shown) may be arranged to demagnetise the stator segments. This electromagnet may for instance be mounted one stator-segment pitch behind the first-named electromagnet and may be energised with a suitable high frequency oscillation. The shaft 37 is rotated by means of a motor 47 and its speed is not important provided that it is high enough. Thus it should be such that the electromagnets make several rotations during the time of one frequency sweep of the radar transmitter.

In this example the necessary amplification may be provided by the single amplifier 42 in the circuit between the commutator brush 38 and the electromagnet 36, thus simplifying the apparatus. Any integration provided should take account of the need to avoid the signals from one terminal of the range responsive device affecting signals from the next succeeding terminal of the range responsive device. For this purpose the time constant of integrating circuits in the amplifier should be shorter than the time taken for the electromagnets to move through one stator pitch. Instead of using electromagnets having two poles in proximity to the stator segments electromagnets each having only one pole sweeping close to the segments may be used. In this case a suitable dynamic balancing arrangement may of course be provided whereby the magnets can be rotated at a desired speed without causing excessive vibration.

A modification of the invention may be employed as illustrated in Fig. 4 to provides a measure of drift, for example in an aircraft. For this purpose two radar beams are employed and these are directed obliquely forward by transmitting aerials 12' and 12", preferably at equal angles on either side of the fore and aft direction of the vehicle assumed to be that of the arrows 48. The echoes received from each of these beams by receiving aerials 13' and 13" are applied to a separate range responsive device and a separate phonic wheel arrangement, represented by blocks 49' and 49". Each of these blocks may be represented by the apparatus within the broken line 49 in Fig. 1. The shafts 22' and 22" of the two phonic wheels are coupled through a mechanical differential gear 50 to some suitable tachometer and counter devices, such as 24 and 25 in Fig. 1. The arrangement is such that when there is no drift both of the phonic wheels rotate at the same speed and no rotation is imparted to the output shaft 51 of the differential gear. Any drift is represented by movement of the output shaft 51.

The two beams of Fig. 4 may be replaced by a single beam such as that employed in performing a spiral scan, the output from the radar receiver being strobed at two suitable points in each scan in order to obtain the two oblique directions of viewing which are required.

Instead of the frequency modulated radar system described there may, of course, be used a pulse modulated system.

Thus as shown in Fig. 5 the transmitter 10' may be modulated by pulses from a pulse modulator 52. A small part of the energy generated in the transmitter 10' is applied through an attenuator 53 to one end of a delay device 54, various tappings on which yield pulses of different time delays. These tappings are connected respectively to gate circuits 55, 55', 55" etc. to open the gates for the duration of the pulses. Each gate, when open, passes a signal from the receiver 14', after amplification at 56, to one of the windings 20a, 20b, 20c etc. of the phonic wheel stator which may be arranged as shown in Fig. 1.

I claim:
1. A measuring device for use in a moving vehicle comprising radar apparatus carried by said vehicle, said apparatus including transmitting means for radiating radio frequency energy, receiving means for receiving parts of said radio frequency energy reflected by objects and for generating voltages therefrom, at least one of said means having a directional aerial, a range responsive device having a plurality of output terminals, means applying said voltages to said range responsive device to generate at said output terminals respectively further voltages each corresponding to a reflection from an object at a different range, means connected to said output terminals for generating a rotating magnetic field from said further voltages, a rotatable member actuated by rotation of said magnetic field and speed measuring means coupled to said rotatable member to indicate the speed thereof.

2. A measuring device according to claim 1, wherein said transmitting means include means modulating the frequency of said radiated energy in accordance with a saw-tooth wave.

3. A measuring device according to claim 2, wherein said range responsive device comprises a plurality of circuits each tuned to a different frequency.

4. A measuring device according to claim 1, wherein said transmitting means include means generating pulses of said radio frequency energy.

5. A measuring device according to claim 4, wherein said range responsive device comprises a delay device having an input terminal and a plurality of output terminals, means applying pulses from said transmitting means to said input terminal to generate at the output terminals of the delay device respectively pulses delayed by different amounts relatively to the pulses applied to the input terminal, a plurality of gate circuits each having an input, an output and a control terminal, means connecting each of said output terminals of the delay device to the control terminal of a different one of said gates circuits to render each said gate circuit operative when one of said further voltages appears at the control terminal thereof, and means connecting said receiving means to said input terminals of all said gate circuits to apply the first-named voltages to said gate circuits, said gate circuits when operative, passing said first-named voltages to the output terminals thereof, and the output terminals of said gate circuits constituting the said output terminals of the range responsive device.

6. A measuring device according to claim 1, comprising means causing said directional aerial to scan an area, and switching means rendered operative only when said aerial is directed toward a predetermined part of said area and connected between said receiving means and said range-responsive device.

7. A device for measuring drift comprising means transmitting radar signals and two receiving means each generating voltages in response to received radar signals, said receiving means being directed to receive reflections of said radar signals from two mutually-inclined directions, each said receiving means including a range responsive device having a plurality of output terminals, means applying said voltages to said range responsive device to generate at said output terminals respectively further voltages each corresponding to a reflection from an object at a different range, means connected to said output terminals generating a rotating magnetic field from said further voltages, and a rotatable member actuated by rotation of said magnetic field, said measuring device also comprising an output shaft and means coupling said rotatable members differentially to said output shaft.

8. A measuring device for determining the speed of a moving vehicle comprising radar apparatus carried by said vehicle, said apparatus including means for radiating radio frequency energy, means for receiving echoes of said radio frequency energy reflected by objects in the path of said radio frequency energy and for generating first voltages therefrom, a range responsive device having a plurality of output terminals, means for applying said first voltages to said range responsive device, said range responsive device including means responsive to echoes from fixed objects at different ranges from said vehicle for effecting second voltages at successive different ones of said output terminals during successive different time intervals, whereby said second voltages appear in succession at said output terminals at a speed related to the speed of said vehicle irrespective of the absolute ranges of said fixed objects from said vehicle, means responsive to said successively appearing second voltages for generating a magnetic field rotating at a rate related to the speed of appearance of said second voltages at said successive output terminals, and means for measuring the rotational rate of said magnetic field thereby to determine the speed of said vehicle.

9. The combination of claim 8 wherein said echoes from said objects at different ranges comprise signals of different radio frequencies, said range responsive device comprising a plurality of differently tuned frequency responsive circuits coupled to said output terminals respectively.

10. A measuring device for a moving vehicle comprising radar apparatus carried by said vehicle, said apparatus including means for transmitting radio frequency energy and for receiving echoes from fixed objects in the path of said energy, a range responsive device having a plurality of output terminals successive ones of which correspond respectively to the reception of echoes from objects at successive equally spaced ranges from said vehicle, means responsive to said fixed object echoes for energizing said output terminals in succession at a rate determined by the speed of said vehicle relative to said fixed objects irrespective of the absolute ranges of said fixed objects, a plurality of circularly disposed pole pieces, means responsive to the successive energization of said output terminals for successively energizing said pole pieces thereby to effect a magnetic field rotating at a rate related to the rate of successive energization of said output terminals, a magnetic rotor in said field rotating with rotation of said field, and means responsive to rotation of said rotor for determining the rotational speed of said field thereby to determine the speed of movement of said vehicle.

References Cited in the file of this patent

UNITED STATES PATENTS

| | | |
|---|---|---|
| 1,367,679 | Adsit et al. | Feb. 8, 1921 |
| 1,638,614 | Brewster | Aug. 9, 1927 |
| 2,436,672 | Sanders | Feb. 24, 1948 |
| 2,540,076 | Dicke | Feb. 6, 1951 |
| 2,540,089 | Barker | Feb. 6, 1951 |
| 2,640,925 | Hirsch | June 2, 1953 |
| 2,688,130 | Whitaker et al. | Aug. 31, 1954 |
| 2,742,639 | Moore et al. | Apr. 17, 1956 |